2,948,759

PROCESS OF NITRATING AROMATIC HYDROCARBONS AIDED BY AN AROMATIC ION EXCHANGE RESIN

Oscar L. Wright, Pittsburgh, Pa., assignor to Pittsburgh Coke & Chemical Company, Pittsburgh, Pa., a corporation of Pennsylvania No Drawing. Filed Feb. 11, 1958, Ser. No. 714,483

15 Claims. (Cl. 260—646)

This invention relates to the nitration of aromatic compounds.

The classic procedures for nitration of aromatic compounds involve the use of mixed acids, i.e., a mixture of nitric and sulfuric acids. Such procedures have the disadvantage that excessively high nitration temperatures are sometimes required. Additionally, when mixed acids are employed, the desired orientation of substituents is not always obtained. For example, para nitrotoluene is a very desirable compound. However, when mixed acids are employed as the catalyst in nitrating toluene, the ratio of ortho nitrotoluene to para nitrotoluene formed is about 2 to 1.

Furthermore, unless care is taken, there is danger of over nitration, i.e., beyond the mono stage.

It is an object of the present invention to employ a novel agent as an aid in nitrating aromatic compounds having at least one ring free of a negative or meta orienting group.

Another object is to increase the percent of para isomer and reduce the percent of ortho isomer formed in nitrating benzene having an ortho-para orienting substituent.

A further object is to simplify and more effectively control the nitration of aromatic compounds.

A more specific object is to nitrate toluene in a manner which will have a higher para to ortho nitro ratio than is obtained using mixed acids.

Yet another object is to nitrate α-nitronaphthalene in a manner whereby the ratio of 1.5 dinitronaphthalene to 1.8 dinitronaphthalene is greater than that obtained using mixed nitric acid and sulfuric acids.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by nitrating aromatic compounds having at least one aromatic ring free of a meta orienting group with the aid of a nuclear sulfonated aromatic ion exchange resin.

As sulfonated phenol-formaldehyde ion exchange resins are readily nitrated and oxidized, especially above 50° C., preferably these resins are avoided.

The preferred sulfonated ion exchange resins are sulfonated styrene-divinyl benzene copolymers which are commercially available as Dowex-50 [described in Ind. Eng. Chem., vol. 40, page 1350 (1948)] and Amberlite IR–120. Both Dowex-50 and Amberlite IR–120 are made in accordance with D'Alelio Patent No. 2,366,007. As the ion exchange resins which can be employed in the present invention, there can be employed any of the resins described in the D'Alelio patent, i.e., water-insoluble sulfonated polymerizates of a polyvinyl aryl hydrocarbon, halohydrocarbon or hydrocarbon ethers and preferably copolymerizates of such polyvinyl compounds with mono vinyl aromatic hydrocarbons or halohydrocarbons. As polyvinyl aromatic compounds which can be used to form the sulfonated polymers and copolymers there may be mentioned the isomeric divinyl benzenes, i.e., para divinyl benzene, ortho divinyl benzene, meta divinyl benzene (and mixtures thereof), the isomeric divinyl toluenes, the isomeric divinyl naphthalenes, the isomeric divinyl xylenes, the isomeric divinyl ethyl benzenes, the isomeric divinyl monochlorobenzenes, the isomeric divinyl polychlorobenzenes, the isomeric divinyl phenyl vinyl ethers, the isomeric divinyl naphthalenes, the isomeric divinyl diphenyls, the isomeric divinyl phenyl vinyl ethers, the isomeric diisophenyl benzenes, etc. There can also be employed the corresponding polyvinyl compounds having three or more vinyl groups. As the monovinyl aromatic compounds used to form the sulfonated copolymer ion exchange resins, there can be employed styrene, ortho vinyl toluene, para vinyl toluene, meta vinyl toluene, α-methyl styrene, the isomeric dimethyl styrenes, o, m and p-ethyl styrene, the isomeric isopropyl styrenes, o, m and p-chloro styrene, o, m and p-fluorostyrene, o, m and p-bromostyrene, the isomeric fluorostyrene, o, m and p-bromostyrene, the isomeric fluorostyrene, o, m and p-bromostyrene, the isomeric fluorostyrene, o, m and p-bromostyrene, the isomeric methyl styrenes, isopropenyl benzene, the isomeric vinyl-chloro-naphthalenes, α-ethyl vinyl styrene, vinyl fluorene, the isomeric vinyl diphenyls, and the isomeric cyclohexyl styrenes.

As the polyunsaturated cross-linking agents, there can also be employed non-aromatic compounds such as divinyl ether, diallyl ether, vinyl allyl ether, dimethallyl ether, dimethallyl sulfide, etc.

Generally, at least 2% of the polymerizable materials is the poly unsaturated compound and this component can be as much as 100% of the polymerizable material. The resin formed generally has at least 0.1 sulfonic acid group per aryl nucleus and normally has an average of 1.5 or even as much as 4 or more sulfonic acid groups per aryl nucleus.

As previously stated, the preferred sulfonated ion exchange resins are the sulfonated copolymers of a divinyl aromatic hydrocarbon and a monovinyl hydrocarbon, most preferably the sulfonated copolymer of divinyl benzene and styrene.

The present invention is primarily useful in ring nitrating difficult to nitrate aromatic compounds such as aromatic hydrocarbons and aromatic halohydrocarbons while it is also useful in nitrating aromatic amines, aromatic acyl amines, phenols, phenol ethers and phenol esters. It is also utilized to nitrate poly ring aromatic compounds having at least one ring free of a negative substituent.

As compounds which can be nitrated, there may be mentioned benzene, toluene, s-butyl benzene, ethyl benzene, propyl benzene, n-butyl benzene, isobutyl benzene, tertiary butyl benzene, amyl benzene, hexyl benzene, decyl benzene, dodecyl benzene, cyclohexyl benzene, 1,2-dimethyl benzene, 1,3-dimethyl benzene, naphthalene, anthracene, α-nitronaphthalene, cumene, benzyl chloride, chlorobenzene, bromobenzene, fluorobenzene, iodobenzene, 1,2-dichlorobenzene, 1,6-dichlorobenzene, 1,3-dichlorobenzene, 1-chloro-3-bromobenzene, 1,2,3-trichlorobenzene, aniline, o-toluidine, m-toluidine, methyl aniline, dimethyl aniline, acetanilide, phenol, o-cresol, m-cresol, cresylic acid (a mixture of o, m and p-cresols), resorcinol, anisole, phenyl acetate, phenyl propionate, phenanthrene, acenaphthene, etc.

The invention is particularly valuable in nitrating mono alkyl or mono halo substituted benzene since it has been found that the nitrating agent of the present invention yields a much larger proportion of para nitro product than results using conventional nitric-sulfuric mixed acids. In fact, this result is obtained even in poly alkyl or poly halo substituted benzenes so long as the para position is open along with at least one ortho position. As a result, the instant invention can be used wherever it is more desirable to favor obtention of the para nitro isomer. The preferred starting material is toluene.

It has also been found that when the nitrating agent of the present invention is utilized to nitrate α-nitronaphthalene, the formation of 1,5-dinitronaphthalene is favored over the formation of 1,8-dinitronaphthalene. When conventional mixed acids are employed, the converse is true. 1,5-dinitronaphthalene is of increasing importance since it is a starting material for preparing 1,5-naphthalene diisocyanates.

In the nitration of cumene to para nitrocumene, according to the present invention the disproportionation which occurs with conventional mixed acid is prevented.

As previously pointed out, even when an excess of nitrating agent is employed in the present reaction, in no event does nitration go beyond the mono stage, i.e., not more than one nitro group can be attached to any aromatic ring.

The nuclear sulfonated aromatic hydrocarbon cation-exchange resins employed normally contain approximately 50% of water. A large proportion of this water must be removed in order to nitrate difficult to nitrate materials such as aromatic hydrocarbons and aromatic halohydrocarbons, although there is no need to remove the water in nitrating more readily nitrated compounds such as the phenols and aromatic amines. In nitrating aromatic hydrocarbons and halohydrocarbons, the water content of the resin is generally kept below 25% and preferably below 10%. Since water is formed in the reaction when a batch process is employed it is desirable that the water be at a minimum to prevent premature cessation of the nitration. In a continuous process the water formed is continually removed and, hence, somewhat more water can be present initially in the ion exchange resin. The water can be removed from the ion exchange resin by refluxing with a liquid hydrocarbon, e.g., toluene, or it can be removed by sulfuric acid washing, etc.

Since the presence of unduly large amounts of water is undesirable, the nitric acid employed should be of at least 30% concentration and preferably is 70 to 100%. The use of 95% nitric acid is especially suitable for nitrating toluene due to its solubility characteristics in the toluene.

The ratio of nitric acid to material to be nitrated, e.g., toluene, is not particularly critical since only mononitration occurs, even when an excess of nitric acid is employed. Preferably a slight excess of nitric acid is employed, e.g., 1.1 mols of nitric acid per mol of toluene or other material to be nitrated, although stoichiometric proportions can be used. Less than stoichiometric amounts of nitric acid can be used, in which case, of course, a portion of the aromatic compound will not be nitrated.

The proportion of ion exchange resin, likewise, is not critical. It is important, however, as explained above, that the ratio of resin to nitric acid be such that the amount of water present is not over the maximum permissible when difficult to nitrate aromatic compounds are employed. While not being limited to any theory of reaction, it is believed that the reaction involves the formation of the nitronium ion according to the equation:

$$HNO_3 + 2RSO_3H \rightarrow NO_2^+ + H_3O^+ + 2RSO_3^-$$

where $RSO_3H$ is the ion exchange resin. Thus, two mols of resin are required for one mol of nitric acid. However, the ion exchange resin is constantly regenerated during the reaction (unlike the nitric acid which is used up) and, hence, the only limiting factor is the formation of water which will eventually render the resin ineffectual.

The nitration reaction takes place on contact of the mixture of nitric acid and aromatic compound with the ion exchange resin. Hence, the use of room temperature is frequently preferred. To prevent oxidation of the resin, it is desirable that the reaction be carried out at a temperature not over 50° C., e.g., 0 to 50° C., and preferably 25 to 50° C. With toluene the preferred temperature is 35° C. and with chlorobenzene the preferred temperature is 45° C.

In one form of the invention the ion exchange resin is normally present in the form of a bed through which the mixture of nitric acid and aromatic compound are allowed to percolate. There is no maximum bed depth and the minimum bed depth is limited solely by the throughput. The bed should be deep enough to complete the nitration by the time the mixture has completely passed through the bed. In this form the process can be carried out continuously by employing an excess of toluene, for example, over the nitric acid, and preferably operating the column at a diminished pressure. As the nitration occurs, water is formed, and the water formed is removed azetropically by the excess toluene. As the mixture is swept through the column, it is heated to 40 to 50° C. and pulled into a bottoms-take-off pot with a column above. The pressure is maintained in the reaction column sufficiently low to vaporize the toluene-water azeotrope, but high enough to allow the mixture of toluene and nitrotoluenes to remain liquid. The temperature in the bottoms-take-off pot is maintained high enough to vaporize the toluene and allow the nitrotoluenes to remain liquid. Toluene and the toluene-water azeotrope are taken off overhead, and the nitrotoluenes are drawn off of the pot. The toluene and water are condensed, separated and the toluene recirculated. Nitrogen dioxide fumes go out with the aqueous phase or are passed out of the system in the gaseous phase.

It is possible to carry out the instant reaction in the presence of inert diluents or solvents, e.g., aliphatic hydrocarbons and halohydrocarbons, e.g., hexane, heptane, carbon tetrachloride, ethylene dichloride, etc., although preferably these are normally omitted. When the aromatic reactant is a solid at the reaction temperature, however, it is frequently desirable to have such solvents present.

Unless otherwise stated, all parts and percentages are by weight.

An additional advantage of the present invention over the use of mixed acids is that it is possible to use more dilute nitric acid, e.g., 70% nitric acid, than is normally employed in the nitration with mixed acids. For example, in nitrating toluene with 70% nitric acid, the toluene is slurried with the nuclear sulfonated aromatic hydrocarbon ion exchange resin and about one-half of the stoichiometric amount of nitric acid to mononitrate all the toluene is added. The acid addition is regulated, along with external cooling, e.g., with circulating water, to moderate the exothermic nature of the reaction. The reactor is designed that the charge can be filtered from the vessel without removing the resin. When the charge has been removed, the resin is washed with two batches of water, the next charge of toluene added to the resin and an azeotropic distillation carried out at atmospheric pressure to remove the water absorbed on the resin. When the vapor temperature has reached 110° C., the toluene which has been separated from the water is recharged to the reactor, the charge cooled and the nitration procedure repeated. The ion exchange resin thus can be used over and over again, which adds to the economy of the process.

In the following examples the ion exchange resin was a sulfonated copolymer of styrene and divinyl benzene since it is readily available commercially. However, any of the other sulfonated ion exchange resins referred to above can be employed in place thereof.

EXAMPLE 1

Toluene was nitrated in a three-liter flask equipped with stirrer, condenser, thermometer and drop funnel. Toluene, 500 g., was cooled to 25° C. and 500 g. of mixed acid was added over a period of one hour, maintaining a temperature less than 25° C. The composition of the mixed acid was 31.0 percent nitric, 15.2 percent water and 53.8 percent sulfuric. The temperature was then allowed to rise to 55 to 60° C. without cooling. This temperature was maintained as the reaction mass was stirred vigorously for two hours.

The reaction mass was poured into ice water, separated and the oil washed with 2 percent sodium hydroxide solution. The oil was then washed twice with cold water. The toluene was stripped off with steam, and the product dried over anhydrous calcium chloride.

In: | G.
--- | ---
Toluene | 500
Mixed acid | 500
Out: |
Product | 275
Toluene | 300

Toluene used _____ mols__ 2.18
HNO₃ used _____ do____ 2.46
Product _____ do____ 2.00
Yield _____ percent__ 92.3

*Analysis:*—58.90 percent ortho; 34.83 percent para; O/P=1.69.

EXAMPLE 2

A mixture of sulfonated styrene-divinyl benzene ion exchange resin, IR–120, which had previously been washed with sulfuric acid, then with water, and next with toluene was heated and the toluene-water azeotrope taken off and separated until the toluene refluxed clear. The mixture of toluene and resin was then cooled to the reaction temperature which was maintained as 90 percent nitric acid was added dropwise. The temperature was then maintained for about 2½ hours after the addition was complete, and the reaction mass was stirred.

The product mixture was filtered and the resin washed with toluene. The oil was then washed with water, dilute sodium carbonate and again with water. The toluene was removed with steam and the product dried over anhydrous CaCl₂.

Several runs were made on this sulfonated ion exchange resin nitration of toluene at various temperatures with varying amounts of resin. The results of these runs are given in Table I.

Table I

| Run No. | Toluene,¹ g. | 90% HNO₃, g. | Ion Exchange Resin, g. | Yield, g. | Temp., °C. | Percent Ortho | Percent Para | Ortho/Para |
|---|---|---|---|---|---|---|---|---|
| 1 | 184 | 70 | 158 | 73 | 25 | 41.5 | 45.7 | 0.91 |
| 2 | 184 | 70 | 158 | 77 | 25 | 39.8 | 43.0 | 0.92 |
| 3 | 184 | 70 | 100 | 63 | 35–40 | 44.4 | 37.2 | 1.19 |
| 4 | 184 | 70 | 158 | 53 | 35–40 | 50.1 | 42.6 | 1.17 |
| 5 | 184 | 70 | 100 | 50 | 45–50 | 52.7 | 40.2 | 1.31 |
| 6 | 184 | 70 | 100 | 42 | 45–50 | 46.6 | 35.1 | 1.33 |
| 7 | 184 | 70 | 200 | 117 | 35 | 53.7 | 39.5 | 1.36 |
| 8 | 184 | 70 | 200 | 116 | 35 | 51.8 | 38.2 | 1.35 |

¹ Toluene, used in excess, and the excess recovered quantitatively.

When the reaction of Example 2 was carried out in the presence of carbon tetrachloride as a solvent, the ortho percentage was somewhat higher. In four runs using carbon tetrachloride, the ratio of ortho to para was 1.4 to 1.5.

It can be seen from Examples 1 and 2 that the use of the sulfonated ion exchange resin favors the formation of para nitrotoluene in comparison with the results using conventional mixed acids. In addition the use of the ion exchange resin permits nitration to be effected at a much lower temperature. Moreover, the lower the temperature the more favorable is the ratio of para to ortho isomer.

It has also been noted that when the sulfonated ion exchange resin is dehydrated with concentrated sulfuric acid and then washed with toluene and not azeotropically distilled that some of the sulfuric acid is adsorbed on the resin and takes part in the reaction, since in such cases the ortho to para ratio is higher.

EXAMPLE 3

Chlorobenzene was nitrated exactly as described in Example 1 utilizing mixed acids and using the amounts and conditions set forth in Table II.

Table II

| Run No. | Chlorobenzene, g. | Mixed Acids, g. | Yield, g. | Temp., °C. | Percent Ortho | Percent Para | Para/Ortho |
|---|---|---|---|---|---|---|---|
| 1 | 500 | 500 | 275 | 55–60 | 36.2 | 64.2 | 1.77 |
| 2 | 100 | 100 | 63 | 55–60 | 29.0 | 52.0 | 1.79 |

EXAMPLE 4

Chlorobenzene was nitrated using Amberlite IR–120 in an identical procedure to that employed in Example 2 in the nitration of toluene. The results in the chlorobenzene nitration are shown in Table III.

Table III

| Run No. | Chlorobenzene | Sulfonated Ion Exchange Resin, g. | 90% Nitric Acid, g. | Yield, g. | Temp., °C. | Percent Ortho | Percent Para | Para/Ortho |
|---|---|---|---|---|---|---|---|---|
| 1 | | 125 | 150 | 82 | 20–25 | | | 2.51 |
| 2 | | 125 | 150 | 86 | 35–40 | 28.3 | 67.2 | 2.37 |
| 3 | | 100 | 70 | 70 | 45–50 | | | 1.98 |
| 4 | | 100 | 70 | 83.5 | 45–50 | 21.7 | 44.9 | 2.07 |
| 5 | | 100 | 70 | 78 | 45–50 | | | 2.42 |
| 6 | | 187 | 70 | 112 | 40–45 | 17.5 | 54.9 | 3.14 |
| 7 | | 158 | 70 | 87 | 40–45 | 23.8 | 68.6 | 2.88 |

It will be noted that utilizing the sulfonated ion exchange resin the para to ortho ratio of the isomeric chloronitrobenzene product was increased, while at the same time it was possible to reduce the reaction temperature.

EXAMPLE 5

Various other materials were nitrated as shown in Table IV. The procedure of Example 2 was utilized, but in addition to the reactants in the examples in Table IV there were present 500 grams of carbon tetrachloride as a solvent. The column "Remarks" shows the method of drying the Amberlite IR-120. The term "Azeotroped resin" signifies that the resin was dried by azeotroping with toluene. In each case there was a larger percentage of para nitro isomer and a lower percentage of ortho nitro isomer than was obtained using conventional mixed nitric-sulfuric acids as the nitrating agent.

Table IV

RESIN NITRATIONS

| Run No. | Material Nitrated | Wt., g. | Sulfonated Ion Exchange Resin, g. | 90% $HNO_3$, g. | Yield, g. | Temp., °C. | Remarks |
|---|---|---|---|---|---|---|---|
| 1 | Br φ | 157 | 158 | 70 | 153 | 35 | $H_2SO_4$ dried resin. |
| 2 | Br φ | 157 | 158 | 70 | 155 | 40 | $H_2SO_4$ dried resin. |
| 3 | φ $CH_2Cl$ | 126 | 158 | 70 | 144 | 35 | $H_2SO_4$ dried resin. |
| 4 | φ $CH_2Cl$ | 126 | 158 | 70 | 138 | 40 | $H_2SO_4$ dried resin. |
| 5 | Br φ | 157 | 158 | 70 | 136 | 35 | Azeotroped resin. |
| 6 | Br φ | 157 | 158 | 70 | 146 | 40 | Azeotroped resin. |
| 7 | φ $CH_2Cl$ | 126 | 158 | 70 | 122 | 35 | Azeotroped resin. |
| 8 | φ $CH_2Cl$ | 126 | 158 | 70 | 125 | 40 | Azeotroped resin. |
| 9 | Cumene | 120 | 158 | 70 | 107 | 35 | $H_2SO_4$ dried resin. |
| 10 | S-Butyl-benzene | 65 | 50 | 35 | 62 | 35 | Azeotroped resin. |

EXAMPLE 6

A slurry was made of 700 ml. (606.2 g.) toluene, 50 ml. (60.25 g.) nitrobenzene, and 100 g. of ion exchange resin, Amberlite IR-120 which had been washed with concentrated $H_2SO_4$ (96%) and then twice with toluene to remove the mechanically held acid. To this slurry was added dropwise 50 ml. (a little more than one mol) of 90 percent nitric acid. The temperature gradually rose to 35° C. and was knocked back to 15° C. with an ice bath and the ice bath removed. Stirring was continued for 2½ hours and the temperature was allowed to go up to room temperature.

The material was then washed with water and the oil separated. This oil was washed again with water, and with 10 percent $Na_2CO_3$ and again with water. It weighed 684 grams. The toluene was stripped off and this mixture of nitrobenzene and nitrotoluenes weighed 128 grams. The yield was about 50 percent of the theoretical amount. The product contained 60 grams of nitrobenzene, 34.4 grams of p-nitrotoluene, 24.2 grams of orthonitrotoluene and 9.4 grams of m-nitrotoluene by infra-red analysis.

The yield of nitrotoluene was 50.5 percent para, 35.6 percent ortho, and 13.9 percent metanitrotoluene. The ratio of ortho to para was 0.705:1.

EXAMPLE 7

In order to establish data on the difference between the $H_2SO_4 \cdot HNO_3$ type nitrating agent and the resin-$SO_3H \cdot HNO_3$ type nitrating agent, the following runs were made. In the first case, Amberlite IR-120 resin was used which had been dehydrated azeotropically with toluene. In the second case the resin had been washed with 96 percent sulfuric acid and drained very dry with the aspirator. In the third case the resin was washed with sulfuric acid and allowed to remain moist with 96 percent sulfuric acid. The three reactions were run in the same manner using 500 ml. (433 g.) of toluene, 100 g. of ion exchange resin and 64 ml. of 70% nitric acid. The temperature during the addition of $HNO_3$ (70%) to the slurry of resin and toluene was maintained below 35° C. and then raised to 50° C. and the mixture stirred three hours. The product was washed with water, 10% $Na_2CO_3$ and again with water and stripped of excess toluene in the customary manner. In the first case the ratio of o-nitrotoluene to p-nitrotoluene was 0.76:1. In the second case the ratio of o-nitrotoluene to p-nitrotoluene was 1.07:1, showing the influence of some absorbed $H_2SO_4$. In the third case the effect of $H_2SO_4$ was pronounced; the ratio of o-nitrotoluene to p-nitrotoluene was 1.38:1. (When toluene is nitrated in the usual manner using $H_2SO_4 \cdot HNO_3$ mixed acids, the ratio of o-nitrotoluene ot p-nitrotoluene is roughly 2:1.)

EXAMPLE 8

450 grams of chlorobenzene was slurried with 100 grams of a previously dried sample of sulfonated ion exchange resin, Amberlite IR-120, as 63 ml. (90 g.) of 70% nitric acid was added. The temperature was raised to 50± 5° C. and stirring continued three hours after the addition was complete. The product was filtered and washed with two portions of water. The oil was separated and weighed. The chlorobenzene was then stripped off of the product at 15–20 mm. pressure. Upon cooling, the flask residue crystallized. A small amount of material "bled" from the solid on standing. This "bleeding" was less than 5 grams.

| In: | G. |
|---|---|
| Chlorobenzene | 450 |
| IR-120 | 100 |
| $HNO_3$ (70%) | 90 |
| Total | 640 |
| Out: | |
| Total crude yield | 480 |
| Recovered chlorobenzene | 328 |
| Product | 139 |
| Loss | 13 |
| Total | 480 |

A small amount of the solid product was recrystallized and melted at 82 to 83° C. This yield was 89% of the theory and the product was about 95 percent para isomer.

EXAMPLE 9

173 grams of α-nitronaphthalene dissolved in 600 grams of carbon tetrachloride was slurried with 100 grams of dried ion exchange resin Amberlite IR-120 (dehydrated by azeotroping with toluene). The nitric acid (90 grams of 70% concentration) was added and the mixture stirred at room temperature for four hours. The dinitronaphthalenes crystallized out of the carbon tetrachloride. The carbon tetrachloride suspension of dinitronaphthalene was decanted and filtered. Benzene was added to the resin and the remainder of the product was removed by solution and flotation. The benzene suspension was filtered and recycled. The combined product was recrystallized from benzene and acetic acid and two impure fractions were obtained. Spectra were taken of each on the infra-red spectrophotometer. The percent of impurity in each sample was calculated from the infra-red and from this the yield was calculated.

In:                                                G.
    Carbon tetrachloride _____ 600
    α-Nitronaphthalene _____ 173
    Nitric acid (70%) _____ 90
    IR-120 (dried) _____ 100
                                              ———
        Total _____ 963
Out:
    IR-120 (wet) _____ 185
    Carbon tetrachloride solution _____ 675
    Solid product _____ 105
                                              ———
        Total _____ 965

The carbon tetrachloride was removed under vacuum and the residue, α-nitronaphthalene and a very small amount of product, weighed 76 g.

Two fractions were obtained by recrystallization of the product. The fraction containing mainly the 1,5-dinitronaphthalene had 8 to 9 percent of the 1,8 isomer. The other fraction was mainly 1,8-dinitronaphthalene and contained about 10 percent 1,5 isomer by infra-red analysis. The first fraction weighed 70 grams and the second weighed 28 grams. This amounts to a yield of 96 grams of recrystallized material. This amounts to about 67 grams of the 1,5-dinitronaphthalene isomer and 29 grams of the 1,8-dinitronaphthalene isomer. This is a 70 percent to 30 percent ratio of 1,5 isomer to 1,8 isomer. The usual ratio obtained on nitrating α-nitronaphthalene with mixed acids is 60 percent 1,8 isomer and 40 percent 1,5 isomer.

Thus, by using the sulfonated ion exchange resin the ratio of 1,5-dinitronaphthalene to 1,8-dinitronaphthalene formed is altered considerably in favor of formation of the 1,5-dinitro isomer.

EXAMPLE 10

50 grams of dried Amberlite IR-120 were slurried with 9.4 grams of phenol and 250 ml. of petroleum ether. The mixture was maintained below 10° C. while 4.7 ml. of 90% nitric acid was added over a period of 5 minutes. The mixture was then maintained at 8±1° C. for 15 minutes. The product formed was separated into fraction by using petroleum ether to recover o-nitrophenol and chloroform to recover the p-nitrophenol. There were recovered 7.5 grams of the para isomer and 5.5 grams of the ortho isomer.

EXAMPLE 11

187 grams of previously dehydrated Amberlite IR-120 were slurried in 500 grams of ethylbenzene at 30° C. and 35 grams of 90% nitric acid were added over a period of ½ hour. The reaction was then continued at 47±2° C. for 3 hours. The product was separated from the ion exchange resin and stripped with steam to remove the excess ethylbenzene to obtain a yield of 73 grams of a mixture of para and ortho nitro ethylbenzenes. Infra-red spectra showed that there was a higher percentage of para nitro isomer and a lower percentage of ortho nitro isomer than was obtained when the same reaction was carried out using mixed nitric and sulfuric acids.

EXAMPLE 12

A slurry of 16 grams (0.125 mol) of naphthalene, 100 grams of previously dehydrated resin (IR-120) and 350 grams of low boiling petroleum ether was prepared in one liter equipment. The 90% nitric acid (12 ml., 18 g., 0.25 mol) was added dropwise over 5–7 minutes. The mixture was stirred and allowed to warm up over a period of two and one-half hours. The highest temperature (39° C.) was reached after about one and one-half hours. This mixture was then filtered. The petroleum ether solution contained a very small amount (less than 1 g.) of α-nitronaphthalene. The product remained on the resin and was extracted with two 300 ml. portions of boiling benzene. The benzene extracts were cooled and the crude 1,5-dinitronaphthalene was collected by filtration. A sample of this material was boiled with aqueous sodium sulfite and recrystallized from hot pyridine. It melted at 217–218° C. The benzene soluble material was recovered by removing the benzene at diminished pressure. A portion fo this solid material was recrystallized twice from acetic acid. It melted at 170–171° C.

The 1,5-dinitronaphthalene fraction weighed 16.5 grams and had less than five percent of the 1,8 isomer by infra red analysis. The solid material recovered from the benzene solubles weighed 9.5 grams, and contained 5–10 percent 1,5 isomer as an impurity. This impurity is quite easy to remove by filtering the cold pyridine solution through a one-inch cake of powdered alumina.

The total yield was 26 grams which is 96 percent of the theoretical.

EXAMPLE 13

A slurry of 100 grams of dehydrated (azeotropically with toluene) ion-exchange resin, IR-120, and 15.4 grams (0.1 mol) acenaphthene in 250 ml. of low boiling petroleum ether was prepared in 500 ml. equipment. To this slurry was added 9.4 ml. (14.1 g., 0.2 mol) of 90 percent nitric acid over 10–12 minutes. There was a slight exotherm and the temperature was maintained at 37±2° C. for two and one-half hours after which the mixture was filtered and the resin washed with 250 ml. of boiling benzene. The two hydrocarbon solutions were combined and the benzene and petroleum ether were removed at low pressure.

The solid product, a mixture of 3-nitro acenaphthene and 3,4-dinitroacenaphthene weighed 20 grams. This solid material was extracted with boiling water. The aqueous solution upon cooling was filtered to produce the 3-nitroacenaphthene. It melted at 105–106° C. The dinitroacenaphthene was recrystallized from hot benzene and melted at 214–215° C.

EXAMPLE 14

A slurry of 17.8 grams of anthracene, 50 grams of dehydrated IR-120 ion-exchange resin in 250 ml. of low boiling petroleum ether was prepared in 500 ml. equipment. To this slurry was added 4.7 ml. (7 g., 0.1 mol) of 90 percent nitric acid in about five minutes. This mixture was stirred for about one hour and filtered. There was only a small amount (less than 0.5 g.) of anthracene in the solvent and nothing else. The resin was extracted with a number of solvents and nothing was removed. Finally, the resin was washed with aqueous alkali and then extracted with benzene. Upon removing the benzene, 8.2 g. of a material melting at 143–145° C. was obtained. Upon recrystallization this 9-nitroanthracene melted at 145–146° C.

EXAMPLE 15

To a slurry containing 17.8 grams phenanthrene, 50 grams of dehydrated IR-120 ion-exchange resin and 250 ml. of low boiling petroleum ether was added over a 5–7 minute period 4.7 ml. (7 g., 0.1 mol) of 90 percent nitric acid. This mixture was stirred at 30° C. for one hour and filtered. Some of the product remained on the resin and was extracted with boiling benzene. 18 grams of solid material which was obviously a gross mixture was obtained. After repeated recrystallizations from ethanol, a few crystals were obtained which melted at 116–117° C. No further analysis of the mixture was obtained. The main product was identified as 9-nitrophenanthrene.

It was observed that while the polynuclear hydrocarbons used in Examples 12–15 would dinitrate, in no instance were dinitro compounds obtained wherein both nitro groups were on the same ring. In fact, it has been found, in general, that no nitration occurs on a ring having a strongly meta orienting group. Thus, the following compounds could not be nitrated by the process of the present invention:

Nitrobenzene, nitrotoluene, p-toluene sulfonic acid, p-chlorobenzene sulfonic acid, p-cumene sulfonic acid, nitro chlorobenzene, anthraquinone, phthalic anhydride, benzoic acid, benzonitrile, benzaldehyde and benzotrichloride.

As previously stated, while the present invention can be employed to nitrate readily nitratable compounds such as phenols and aromatic amines, it is primarily useful in nitrating difficult to nitrate materials and is of most importance in increasing the proportion of para isomer obtained in nitrating monoalkyl and monohaloalkyl substituted aromatic hydrocarbons and in the formation of 1,5-dinitronaphthalene.

These more difficult to nitrate compounds are not the equivalent of the phenols and amines since there are various other methods which will adequately nitrate the phenols and amines, but will not satisfactorily nitrate the more difficult to nitrate preferred materials of the present invention.

What is claimed is:

1. A process of nitrating an aromatic hydrocarbon comprising carrying out the nitration with nitric acid in the presence of a nuclear sulfonated copolymer of a monovinyl aromatic hydrocarbon and a polyvinyl aromatic hydrocarbon ion exchange resin.

2. A process according to claim 1 wherein the ion exchange resin is a sulfonated copolymer of styrene and divinyl benzene.

3. A process of nitrating mononitronaphthalene comprising carrying out the nitration with nitric acid in the presence of an ion exchange resin which is a sulfonated copolymer of styrene and divinyl benzene.

4. A process of nitrating a monoalkyl benzene comprising carrying out the nitration with nitric acid in the presence of ion exchange resin which is a sulfonated copolymer of a monovinyl aromatic hydrocarbon and a polyvinyl aromatic hydrocarbon.

5. A process according to claim 4 wherein the copolymer is a styrene-divinyl benzene coplymer.

6. A process according to claim 4 wherein the monoalkyl benzene is toluene.

7. A process according to claim 6 wherein the ion exchange resin is a sulfonated styrene-divinyl benzene copolymer.

8. A process of nitrating a monohalo benzene comprising carrying out the nitration with nitric acid in the presence of an ion exchange resin which is a sulfonated copolymer of a monovinyl aromatic hydrocarbon and a polyvinyl aromatic hydrocarbon.

9. A process according to claim 8 wherein the monohalo benzene is monochloro benzene.

10. A process according to claim 9 wherein the ion exchange resin is a sulfonated styrene-divinyl benzene copolymer.

11. A process of nitrating α-nitronaphthalene comprising carrying out the nitration with nitric acid in the presence of an ion exchange resin which is a sulfonated copolymer of a monovinyl aromatic hydrocarbon and a polyvinyl aromatic hydrocarbon.

12. A process according to claim 11 wherein the ion exchange resin is a sulfonated styrene-divinyl benzene copolymer.

13. A process of nitrating an aromatic compound selected from the group consisting of aromatic hydrocarbons, haloaromatic hydrocarbons, unsubstituted phenols, unsubstituted cresols, amines, acetanilide, anisole, phenol esters of lower alkanoic acids and mononitro naphthalene comprising carrying out the nitration at a temperature up to 50° C. with nitric acid in the presence of a nuclear sulfonated copolymer of a monovinyl aromatic hydrocarbon and a polyvinyl aromatic hydrocarbon ion exchange resin in the presence of not more than 25% of water based on the weight of the resin.

14. A process of nitrating a halo aromatic hydrocarbon comprising carrying out the nitration with nitric acid in the presence of a nuclear sulfonated copolymer of a monovinyl aromatic hydrocarbon and a polyvinyl aromatic hydrocarbon ion exchange resin.

15. A process according to claim 14 wherein the ion exchange resin is a sulfonated copolymer of styrene and divinyl benzene.

No references cited.